(12) United States Patent
Manzanero Fernandez et al.

(10) Patent No.: US 11,634,674 B2
(45) Date of Patent: Apr. 25, 2023

(54) METHOD AND EQUIPMENT FOR PRESSURIZED INJECTION OF AIR OR OTHER GASES IN A CONTROLLED MANNER INTO WINE MAKING TANKS

(71) Applicant: PRODUCTOS AGROVIN, S.A., Alcazar de San Juan (ES)

(72) Inventors: Irene Manzanero Fernandez, Alcazar de San Juan (ES); Juan Alberto Iniesta Ortiz, Alcazar de San Juan (ES); Ricardo Jurado Fuentes, Alcazar de San Juan (ES)

(73) Assignee: PRODUCTOS AGROVIN, S.A., Alcazar de San Juan (ES)

( * ) Notice: Subject to any disclaimer, the term of this patent is extended or adjusted under 35 U.S.C. 154(b) by 125 days.

(21) Appl. No.: 16/970,827

(22) PCT Filed: May 16, 2019

(86) PCT No.: PCT/ES2019/070321
§ 371 (c)(1),
(2) Date: Aug. 18, 2020

(87) PCT Pub. No.: WO2019/207197
PCT Pub. Date: Oct. 31, 2019

(65) Prior Publication Data
US 2020/0369992 A1    Nov. 26, 2020

(30) Foreign Application Priority Data
May 18, 2018    (ES) .............................. ES201830476

(51) Int. Cl.
*C12G 1/032*    (2006.01)
*B01F 33/40*    (2022.01)
(Continued)

(52) U.S. Cl.
CPC .......... *C12G 1/0216* (2013.01); *B01F 33/408* (2022.01); *B01F 33/4062* (2022.01); *B01F 35/1452* (2022.01); *B01F 2101/16* (2022.01)

(58) Field of Classification Search
CPC ..... C12G 1/0216; C12G 1/02; B01F 33/4062; B01F 33/408; B01F 2101/16; B01F 33/403; B01F 35/1452; B01F 35/1453
(Continued)

(56) References Cited

U.S. PATENT DOCUMENTS 3,424,349 A * 1/1969 Vance ..................... B28C 7/165
                                                    222/145.8
10,563,157 B2 * 2/2020 Floridia ............... C12G 1/0216
(Continued)

FOREIGN PATENT DOCUMENTS

EP    0477818 A2    4/1992
EP    2179664 A1    4/2010
(Continued)

OTHER PUBLICATIONS

Google Translation of FR2596410 Oct. 1987; Magyar.*
(Continued)

*Primary Examiner* — Charles Cooley
(74) *Attorney, Agent, or Firm* — Lucas & Mercanti, LLP

(57) ABSTRACT

A method and equipment for the pressurized injection of air or other gases in a controlled manner into wine making tanks or similar for the purpose of efficiently breaking up the cap and extracting polyphenolic and aromatic compounds from the skins to the liquid portion (must) after the crushing of the grapes using the method for pumping over the grape harvest during the maceration thereof.

11 Claims, 15 Drawing Sheets

(51) Int. Cl.
  *B01F 35/10* (2022.01)
  *B01F 101/16* (2022.01)

(58) Field of Classification Search
  USPC .......................................................... 366/138
  See application file for complete search history.

(56) References Cited

U.S. PATENT DOCUMENTS

| | | | |
|---|---|---|---|
| 11,427,795 B2* | 8/2022 | Floridia | .................... C12G 1/02 |
| 2005/0181499 A1 | 8/2005 | Brahmbhatt | |
| 2007/0065927 A1 | 3/2007 | Brahmbhatt | |
| 2017/0313964 A1* | 11/2017 | Ghidi | ....................... C12G 1/02 |
| 2017/0321175 A1* | 11/2017 | Floridia | ............... C12G 1/0216 |
| 2020/0369992 A1* | 11/2020 | Manzanero Fernandez | ................ B01F 33/4062 |
| 2021/0115363 A1* | 4/2021 | Manzanero Fernandez | ................ C12G 1/005 |
| 2022/0372413 A1* | 11/2022 | Floridia | ................... C12G 1/02 |

FOREIGN PATENT DOCUMENTS

| | | | | |
|---|---|---|---|---|
| ES | 2241985 T3 | | 11/2005 | |
| FR | 2596410 | * | 10/1987 | ............... C12G 1/02 |
| FR | 2596410 A2 | | 10/1987 | |
| FR | 2797271 | * | 6/2002 | ........... C12G 1/0213 |
| WO | 2014/072562 A1 | * | 5/2014 | |

OTHER PUBLICATIONS

Google Translation of FR279721 Jun. 2002; Blain.*
International Search Report for Corresponding International Application No. PCT/ES2019/070321 (3 Pages) (dated Aug. 20, 2019).

* cited by examiner

METHOD AND EQUIPMENT FOR PRESSURIZED INJECTION OF AIR OR OTHER GASES IN A CONTROLLED MANNER INTO WINE MAKING TANKS

CROSS REFERENCE TO RELATED APPLICATION

This Application is a 371 of PCT/ES2019/070321 filed on May 16, 2019 which, in turn, claimed the priority of Spanish Patent Application No. P201830476 filed on May 18, 2018, both applications are incorporated herein by reference.

OBJECT OF THE INVENTION

The present invention relates to a method and equipment for the pressurised injection of air or other gases in a controlled manner into wine making tanks or similar for the purpose of extracting polyphenolic and aromatic compounds using the method for pumping over the grape harvest during the maceration thereof.

Particularly, the invention relates to the transfer of phenolic and aromatic compounds from the skin to the liquid portion (must) after the crushing of the grapes using, to that end, a method and equipment based on the pressurised injection of air or other gases in a controlled manner into wine making tanks.

More particularly, the invention relates to the pressurised injection of air or other gases in a controlled manner into wine making tanks for the purpose of efficiently breaking up the cap and making the polyphenolic and aromatic compounds available to the liquid medium for integration thereof into said liquid medium, enhancing the characteristics of the wine.

DESCRIPTION OF THE STATE OF THE ART

Once the grape harvest has been vatted in maceration tanks, carbon dioxide bubbles which give rise to the formation of a dense layer in the upper portion of the grape harvest, referred to as cap and made up of skins and pulp that float up due to said gas, are released. To extract the polyphenolic and aromatic compounds present in the skins and pulp making up said cap, this cap must be broken up into portions such that the liquid comes in contact with the entire solid mass and thereby favours this flow of compounds from the solid portion to the liquid portion.

Conventionally, said cap was broken up by performing liquid phase extractions in the lower portion of the grape harvest tank with which the cap is soaked until it softens and breaks.

Systems for breaking up the cap in which the means for the pressurised injection of air have a dynamic position, wherein said position must be modified during the operation of the system, have been developed.

An example of these systems is disclosed in patent ES2491985T3 which relates to a method and device for treating the cap of the maceration in red wine production for which a system and mechanisms which modify the emission direction and position of the nozzle element with respect to the container during operation, are required.

Compared to the systems according to the invention, in which the means for injecting air remain unaltered in the lower portion of the tank, systems such as those of patent ES2491985T3 present the drawback of requiring bulky, high maintenance, and expensive installations; however, and taking into account the hostility of the environment in which they perform their function, said systems, particularly the moving parts thereof, often suffer breakdowns which greatly limit their effectiveness and efficiency.

Likewise, systems which allow breaking up said cap by means of the pressurised injection of air or other gases in a controlled manner have been developed recently.

Patent AU2004101059 relates to a system for the pressurised injection of air into the grape harvest, the diffusers of which are located at the bottom of the tank, all of them being at the same height or the same level and all of them injecting the same amount of air at the same time, generating uniform jets that reach the cap under the same pressure and beam aperture conditions (see FIGS. 2A and 2B), such that said cap is broken up rather inefficiently, and it furthermore presents the risk of the diffusers getting blocked since its opening port is pointed upwards and located at a level where solid waste products frequently accumulate in the tanks.

Patent application WO2016/087966A1 discloses a system for the pressurised injection of air or other gases in a controlled manner, the diffusers of which are all located at the same level, in the walls of the tank. The system described in said patent application cannot be applied at the bottom of the tank which limits its application, and in terms of the method that is followed, it is based on the sequential injection of air into the tank, acting on a single point of the cap at all times and with the same amount of air, and therefore under the same pressure and beam aperture conditions in each injection, which is inefficient for breaking up said cap and limits the extraction of polyphenolic and aromatic compounds.

To solve the aforementioned problems, the method and equipment for the pressurised injection of air or other gases according to the invention is based on a dual injection with diffusers or nozzles which inject air in twos into the tank, simultaneously striking at least two points of the cap during the actuation of the system. Furthermore, the diffusers are located inside the tank at a different height or level, so the pressure and beam aperture conditions in each injection are different. The cap is therefore subjected to plastic deformation which breaks up said cap efficiently and maximises the extraction of the polyphenolic and aromatic compounds.

In the event that diffusers have to be installed in an odd number, the assembly of diffusers is distributed in groups of two and three diffusers, where clusters of three diffusers may exist in the dual injection system.

Likewise, the system for the pressurised injection of air or other gases in a controlled manner according to the invention can be installed in any type of existing or newly commissioned tank, minimising cost and using minimal space, utilising, where possible, underused spaces such as, for example, the bottom of the tank in self-emptying tanks or tanks having a flat bottom with legs.

DESCRIPTION OF THE INVENTION

The present invention provides a method and equipment for the pressurised injection of air or other gases in a controlled manner into wine making tanks or similar for the purpose of carrying out the method of pumping over the grape harvest during the maceration thereof.

Another object of the present invention is to overcome the problems existing in the prior art.

Other additional objects and advantages of the present invention are derived from the following description, taking into consideration the figures that are included and the preferred exemplary embodiments that are described in an illustrative but non-limiting manner.

The injections can be injections of pressurised air or of any other gas that is functionally equivalent and can be used as an alternative. Particularly, said injections can be injections of nitrogen or other inert gases.

Maceration is understood to be the extraction process involving two phases: a solid phase and a liquid phase. The solid product has a series of extractant liquid-soluble compounds that are to be extracted. In wine production, the grape peel or skin (solid product) contains polyphenolic and aromatic compounds (that are to be extracted to provide the end product with greater colour intensity and more aromas). During maceration, these compounds are solubilised in the liquid (first the must and then the wine).

For the purpose of the present description, maceration is divided into the following steps: pre-fermentation maceration, alcohol fermentation 1 or FAL1, alcohol fermentation 2 or FAL2, and post-fermentation maceration. Each of said steps is described below:

Pre-fermentation maceration: maceration step prior to the generation of alcohol in the medium, which seeks to prolong this process to achieve greater extraction of the polyphenolic and aromatic compounds.

FAL1 (alcohol fermentation 1): first phase of the fermentation process. It starts with the transformation of must sugars into alcohol. Generally, said process starts with a density of 1.09 g/cm$^3$ and ends when said density drops to 1.04 g/cm$^3$.

FAL2 (alcohol fermentation 2): transformation of the last must sugars into alcohol. Generally, it starts with a density of about 1.04 g/cm$^3$ and ends when said density drops to below 0.995 g/cm$^3$.

Post-fermentation maceration: once all the sugars have been transformed into alcohol, contact of the solid phase with the liquid phase is prolonged for the same purpose of achieving greater extraction of polyphenolic and aromatic compounds.

During grape harvest maceration, pumping-over operations aimed at activating the maceration of the skins with the must are applied.

The method and equipment for the pressurised injection of air or other gases for the purpose of carrying out the pumping-over operations according to the invention is based on a dual injection with means for the pressurised injection of air which inject air into the tank at least in twos, simultaneously striking at least two regions of the cap during the actuation of the system. Furthermore, said means for the pressurised injection of air are located inside the tank at a different height or level, so the pressure and beam aperture conditions in each injection are different. The cap is therefore subjected to plastic deformation which breaks up said cap efficiently and maximises the extraction of the polyphenolic and aromatic compounds.

Advantageously, it has been found that the cap is broken up at even greater efficiency by also varying the penetration of the means for the pressurised injection of air into the tank.

In terms of the height or level of the means for the pressurised injection of air and penetration thereof into the tank, according to the method and equipment for the pressurised injection of air, it has been determined, by means of a theoretical study of the system of forces generated by the action of the pumping-over diffusers or nozzles, that the maximum plastic deformation which breaks up the cap efficiently and maximises the extraction of the polyphenolic and aromatic compounds is obtained with the diffusers being arranged according to the dimensions indicated in the following table:

| D | | N | | Number of diffusers [n] | | | |
|---|---|---|---|---|---|---|---|
| | | | | 1 | 2 | 3 | 4 |
| ≤ | 3500 | 3 | h | 112-132 | 133-158 | 159-188 | |
| | | | p | 97-145 | 146-454 | 455-864 | |
| 3501 | 5000 | 4 | h | 112-132 | 133-158 | 159-188 | 189-223 |
| | | | p | 97-145 | 146-454 | 455-864 | 864-1209 |
| | | | p | 97 | 146 | 455 | 864 |

| D | | N | | Number of diffusers [n] | | | |
|---|---|---|---|---|---|---|---|
| | | | | 5 | 6 | 7 | 8 |
| 5001 | 6000 | 5 | h | 224-266 | | | |
| | | | p | 1,210-1,331 | | | |
| 6001 | 7000 | 6 | h | 224-266 | 267-316 | | |
| | | | p | 1,210-1,331 | 1,332-1,070 | | |
| 7001 | 9000 | 7 | h | 224-266 | 267-316 | 317-376 | |
| | | | p | 1,210-1,331 | 1,332-1,070 | 1,069-865 | |
| 9001 | >12000 | 8 | h | 224-266 | 267-316 | 317-376 | 377-399 |
| | | | p | 1,210-1,331 | 1,332-1,070 | 1,069-865 | 864-456 |

Where:
"D" is the diameter of the circular tank or the longest diagonal if the tank is polygonal,
"N" is the number of diffusers installed in the tank.
"h" is the height of the diffuser in mm, and,
"p" the penetration of the diffuser into the tank in mm.

These results have also been experimentally proven while conducting the research that gave rise to the invention.

With respect to the actuation of the pumping-over system in each of these phases and as a result of the research that has been conducted, it has been found that in the pre- and post-fermentation steps, the pumping over operation can be limited to the homogenisation of the entire mass in wine making, prolonging the contact time between solid and liquid phases, so these pumping over operations have a shorter and less frequent injection of air. However, during the two alcohol fermentation steps (FAL1 and FAL2), when more carbon dioxide is generated and the cap becomes more compact, longer and more frequent injections are advantageous. These more intense and frequent injections furthermore allow more carbon dioxide to be released from the mass in wine making, with the desired effect of the temperature of the medium being contained or reduced, counteracting the temperature increase said mass experiences due to the fermentation process itself.

It follows from the foregoing that the preferred actuation times of the pumping-over system according to the invention in each of the phases are as follows:

| | Injection time (seconds) | Switching time (minutes) | Cycle rest time (minutes) |
|---|---|---|---|
| Pre-fermentation maceration | 1-3 | 0.5-10 | 120-600 |
| FAL 1 (Alcohol fermentation 1) | 2-10 | 0.5-10 | 90-300 |
| FAL 2 (Alcohol fermentation 2) | 2-10 | 0.5-10 | 90-300 |
| Post-fermentation maceration | 1-2 | 0.5-10 | 150-720 | wherein:
injection time (t) is the time during which each pair of injectors introduces gas into the tank continuously.

switching time ($t_c$) is the time that elapses between the injection by a pair of diffusers and the injection by the pair of consecutive diffusers.

cycle rest time ($t_r$) is the time that elapses between the end of a pumping-over cycle and the start of the following cycle, with a cycle consisting of the sequential actuation of all the pairs of diffusers.

n being the number of pairs of diffusers, the total injection time per cycle is $n \cdot t_i$, the total switching time per cycle is $(n-1) \cdot t_c$, and the total rest time per cycle is $t_r$.

In terms of the number of daily pumping-over operations depending on the grape variety and its phenolic ripeness for the different steps into which actuation of the pumping-over system has been divided, the following intervals have been determined:

|  |  | Varieties | | | | | |
| --- | --- | --- | --- | --- | --- | --- | --- |
|  |  | High polyphenolic compound content | | Medium polyphenolic compound content | | Low polyphenolic compound content | |
|  |  | Degree of ripeness | | | | | |
|  |  | 1.5 | >1.5 | 1.5 | >1.5 | 1.5 | >1.5 |
| Pumping over steps | Pre-fermentation maceration | 10-12 | 10-12 | 9-11 | 9-11 | 8-10 | 8-10 |
|  | FAL1 and FAL2 | 10-12 | 9-11 | 11-14 | 10-12 | 12-16 | 11-14 |
|  | Post-fermentation maceration | 8-10 | 7-8 | 7-8 | 6-8 | 6-8 | 6-7 |

Varieties with a high polyphenolic compound content (these compounds are present in both the skin and the pulp of the fruit) are, for example, Alicante Bouschet.

Varieties with medium polyphenolic compound content (these compounds are present in the skin of the fruit) are, for example, Tempranillo, Mourvèdre, Syrah, Cabernet Sauvignon, etc.

Varieties with low polyphenolic compound content (these compounds are present in a very low concentration in the skin of the fruit) are, by way of example, Pinot Noir.

The degree of ripeness or phenolic ripeness rate (PRR) or value, above which the grapes are very close to reaching their probable maximum colour value, and where the astringency and greenness of the tannins of the peel are close to the minimum value, can be measured with the CROMOENOS© system or equipment, where it is established that for $PRR \leq 1.5$ the grapes reach their optimum state of phenolic ripeness and for $PRR > 1.5$ the grapes have not reached phenolic ripeness.

The operation of the pumping-over system is as follows: each pair of diffusers or nozzles is put into operation during the injection time according to the step of the maceration that is being performed. During said time, the selected pair of diffusers is injecting air into the maceration tank. After the injection time has elapsed, both diffusers stop. At the end of switching time, the next pair of diffusers in the sequence is put into operation, preferably hourly, and said pair of diffusers will be injecting air into the maceration tank during the mentioned injection time. Once all the pairs of diffusers have intervened in the process, they will be on standby during the rest time, after which, the first pair of diffusers comes into operation again during the injection time, after which it stops and the second pair of diffusers comes into operation once the switching time has elapsed, and so on and so forth.

This operation is repeated with times that are suitable for each maceration step, changing the values and adapting them to each grape harvest maceration step.

Advantageously, the actuation times of the pumping-over system (injection time, switching time, and cycle rest time) can be controlled by means of a microprocessor of the PC type, PLC type, or similar, in which the time values are fixed or can be varied by the user of the pumping-over system.

An additional feature of the method and equipment according to the invention is that they achieve the pumping-over effect on most of the surface of the cap and even on all of said surface. To that end, the means for the pressurised injection of air will be located such that the penetration of said means into the tank will vary, conditioned by the area of action of the different means overlapping as little as possible, and/or the gas outlets of the means will be arranged in an asymmetrical manner in relation to the axes of the section of the tank.

Another additional feature of the invention is the separation of the control valves from the compressed air distribution circuit so that they can be isolated from the environment and protected against soiling, deterioration due to impacts, etc., installing said valves such that they are clustered in a duly protected control valve centre. In a preferred embodiment, said control valves are solenoid valves located in a junction box from which control lines acting on the mechanical valves which allow the passage of air and which are inclined seated valves in a preferred embodiment, are derived.

Likewise, another additional feature of the method and equipment according to the invention is the inclusion of a system for cleaning the inside of the means for the pressurised injection of air which, once the tank is emptied, are filled therein with liquid and/or crushed grape pulp which can degrade rapidly under certain conditions, causing putrefaction and unwanted substances. To that end, the method is complemented with an injection of water into the means for the pressurised injection of air, water which entrains the waste products of wine making from the inside of said means, cleaning said inside. Compressed air which dries the means for the pressurised injection of air by eliminating the remaining water is again injected later. In a preferred embodiment, said injection of water is performed through the compressed air distribution circuit of the equipment and, in an even more preferred embodiment, a water intake is arranged in the compressed air pipe.

Furthermore, yet another additional feature of the system according to the invention is the assembly of the on-off valves of the means for the pressurised injection of air such that, when a problem or breakdown occurs, said valves allow injection according to a method in which each of said valves can be put out of operation in an independent manner, allowing the operation of the rest of the means for the pressurised injection of air without stopping the system. To that end, in a preferred embodiment, in the equipment according to the invention, the on-off valves are located between connections clamp, formed by a gasket, a connection bushing and a clamp, installed between fluid cut-off elements, such as a ball valve.

Advantageously, the actuation of the pumping-over system is carried out with a pressure of the pressurised air system comprised between 3 and 12 bar for the purpose of ensuring the effective operation of the seated valve which allows the passage of air, preferably between 6 and 8 bar. The devatting system can work with air at the pressure obtained directly in the pressurised air system or by means of a pressure regulator.

The compressed air used in the pumping-over system must be free of impurities such as moisture, oils and suspended particles, such that (food grade) purified air can be used directly, or the method according to the invention can include an air purification step.

When gas supplied by a compressor is used, the equipment will include filters at the outlet of said compressor to eliminate moisture, oils and suspended particles from the compressed air.

Both the method and the equipment according to the invention can be controlled through a microprocessor of the PC type, PLC type, or similar, which performs all the operations in an automated manner based on values that are previously fixed or selected by the user.

DESCRIPTION OF THE FIGURES

To complete the description that is being made and to help make the invention fully understandable, said description is accompanied by a set of figures wherein the following is depicted with an illustrative and non-limiting character.

PREFERRED EMBODIMENTS

To complete the description that is being made and for the purpose of helping to better understand its features, several specific exemplary embodiments of systems for the pressurised injection of air or other gases in a controlled manner into wine making tanks according to the invention are provided in the present specification. These examples are provided for illustration purposes and do not seek to limit the present invention. Furthermore, the present invention covers all the possible combinations of particular and preferred embodiments herein indicated.

Figure 1:
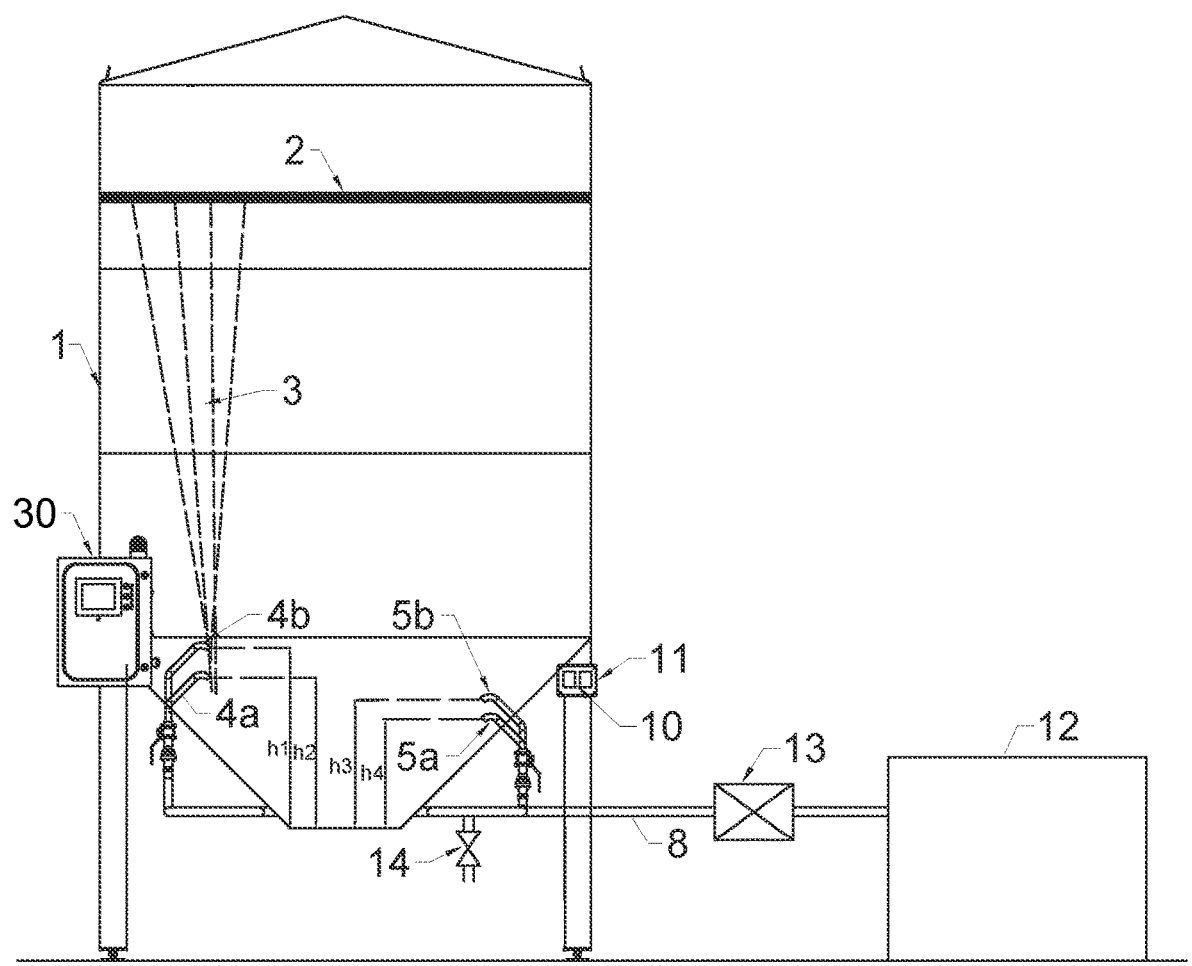
FIGS. 1 and 2 show an elevational view and a plan view, respectively, of a general diagram of equipment for the pressurised injection of air or other gases in a controlled manner into wine making tanks for performing pumping-over operations according to the invention.
Figure 2:
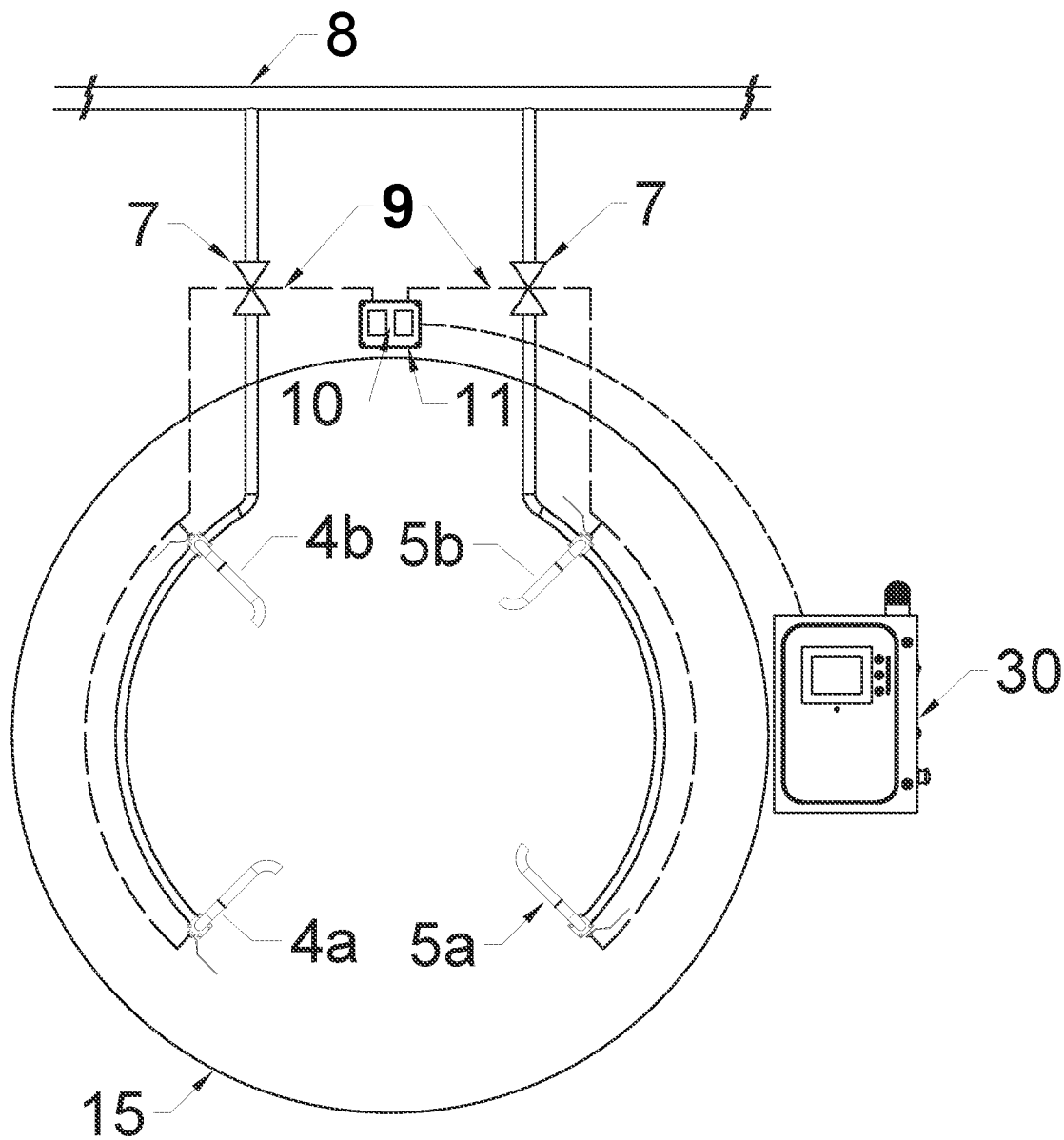

FIGS. 1 and 2 show an elevational view and a plan view, respectively, of a general diagram of equipment for the pressurised injection of air or other gases in a controlled manner into wine making tanks for performing pumping-over operations according to the invention. The cap (2) is formed in the wine making tank (1) during the wine making process. To break up the cap, the means for the pressurised injection of air, i.e., diffusers (4a, 4b), inject air (3) into the tank, simultaneously striking at least two regions of the cap during the actuation of the system. The diffusers (4a, 4b, 5a, 5b) are located at the bottom of the tank at a different height or level ($h_1$, $h_2$, $h_3$, $h_4$), so the pressure and beam aperture conditions in each injection are different. The cap (2) is therefore subjected to plastic deformation which breaks up said cap efficiently and maximises the extraction of the polyphenolic and aromatic compounds.

The diffusers (4a, 4b, 5a, 5b) are located between the compressed air distribution circuit (8) and the inside of the tank (1).

The actuation times of the diffusers (4a, 4b, 5a, 5b) are controlled by means of a microprocessor (30), in which the time values are varied by the user of the pumping-over system.

As seen in FIG. 2, the on-off valves (7) of the compressed air distribution circuit (8) act simultaneously on a pair of diffusers (4a, 4b, 5a, 5b) and are operated, through the corresponding control circuits (9), from the solenoid valves or control valves (10) installed in the junction box or control valve centre (11).

Figure 2B:
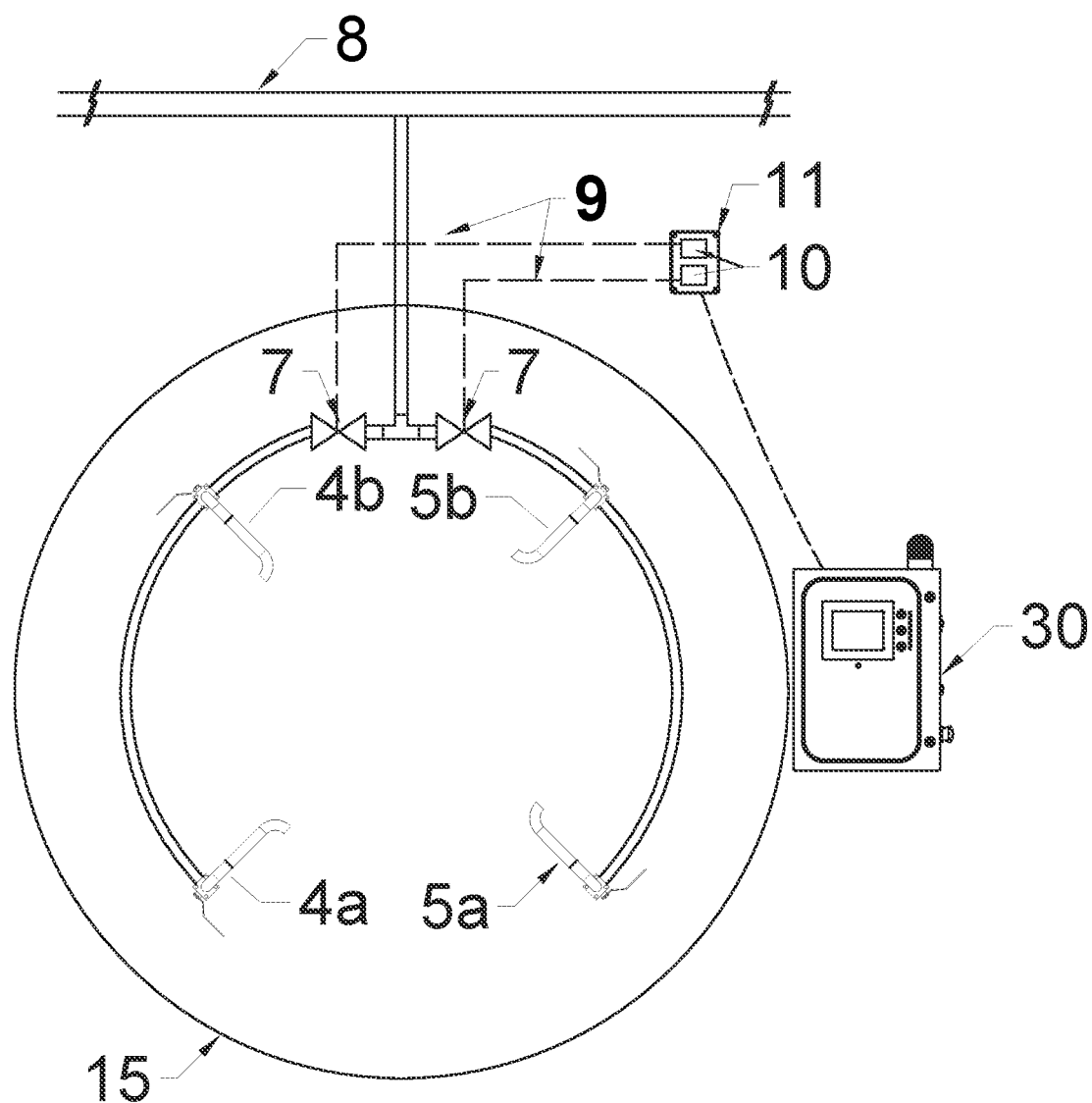
FIG. 2B shows another embodiment of the invention, varying the tapping mode in the compressed air distribution circuit.

FIG. 2B depicts another embodiment of the invention in which a single tapping is performed in the compressed air distribution circuit (8). Similarly, the on-off valves (7) of the compressed air distribution circuit (8) act simultaneously on a pair of diffusers (4a, 4b, 5a, 5b) and are operated, through the corresponding control circuits (9), from the solenoid valves or control valves (10) installed in the junction box or control valve centre (11).

Continuing with the description of FIG. 1, the air is supplied by the compressor (12) incorporating filters (13) in the outlet of said compressor and the compressed air distribution circuit (8) includes a water intake (14) for cleaning the diffusers (4a, 4b, 5a, 5b) once the pumping over of the grape harvest processed in the tank (1) has been completed.

Preferably, the main network of the compressed air distribution circuit (8) is DN50 (2") and the branches to the on-off valves (7) are DN25 (1").

Example 1: Self-Emptying Tank

Figure 3:
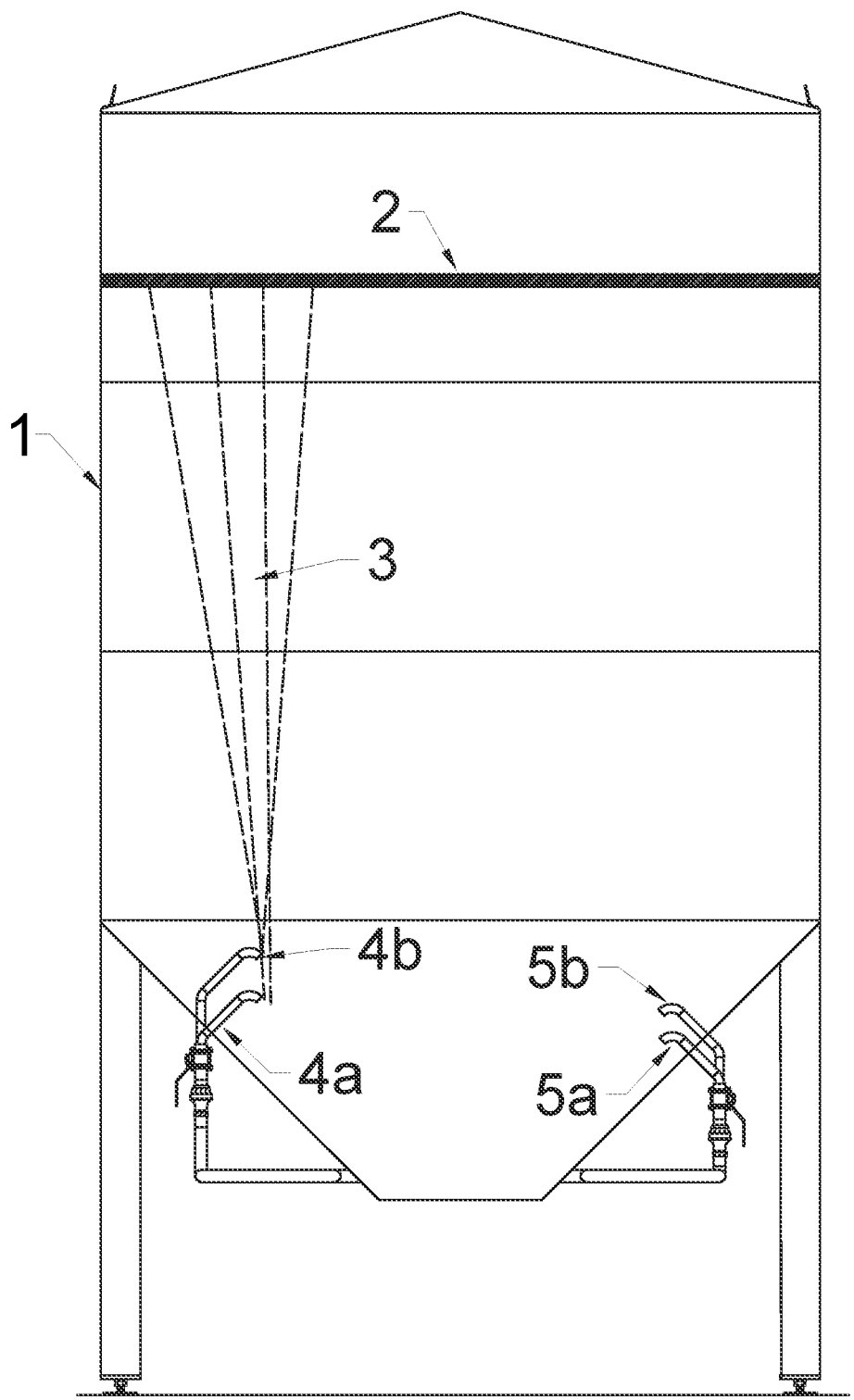
FIG. 3 shows equipment for the pressurised injection of air according to the invention installed in a self-emptying tank.

FIG. 3 shows equipment for the pressurised injection of air according to the invention installed in a self-emptying tank (1).

The means for the pressurised injection of air, i.e., diffusers (4a, 4b, 5a, 5b), inject air (3) into the tank, simultaneously striking at least two regions of the cap during the actuation of the system, and are located at the conical-shaped bottom of the tank (1) at a different height or level, so the pressure and beam aperture conditions in each injection are different.

Example 2: Tank Having a Flat Bottom Arranged on Legs

Figure 4:
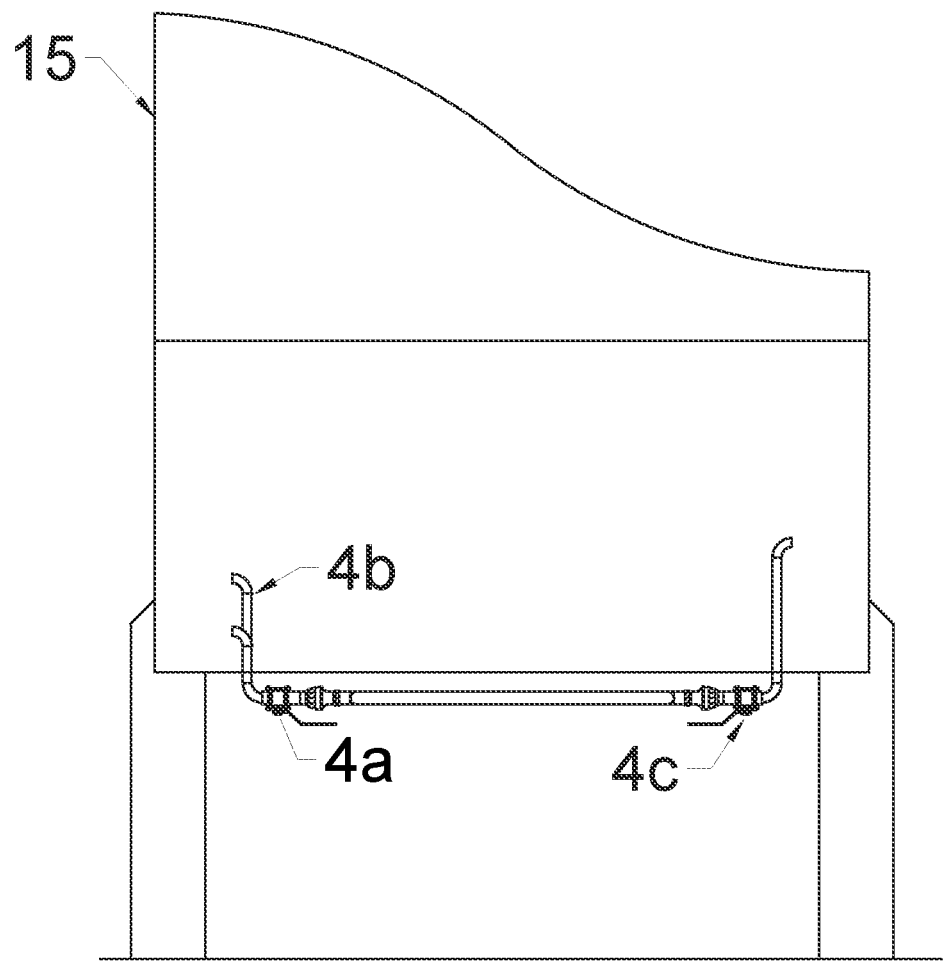
FIGS. 4 and 5 show equipment for the pressurised injection of air according to the invention installed in a tank having a flat bottom arranged on legs.
Figure 5:
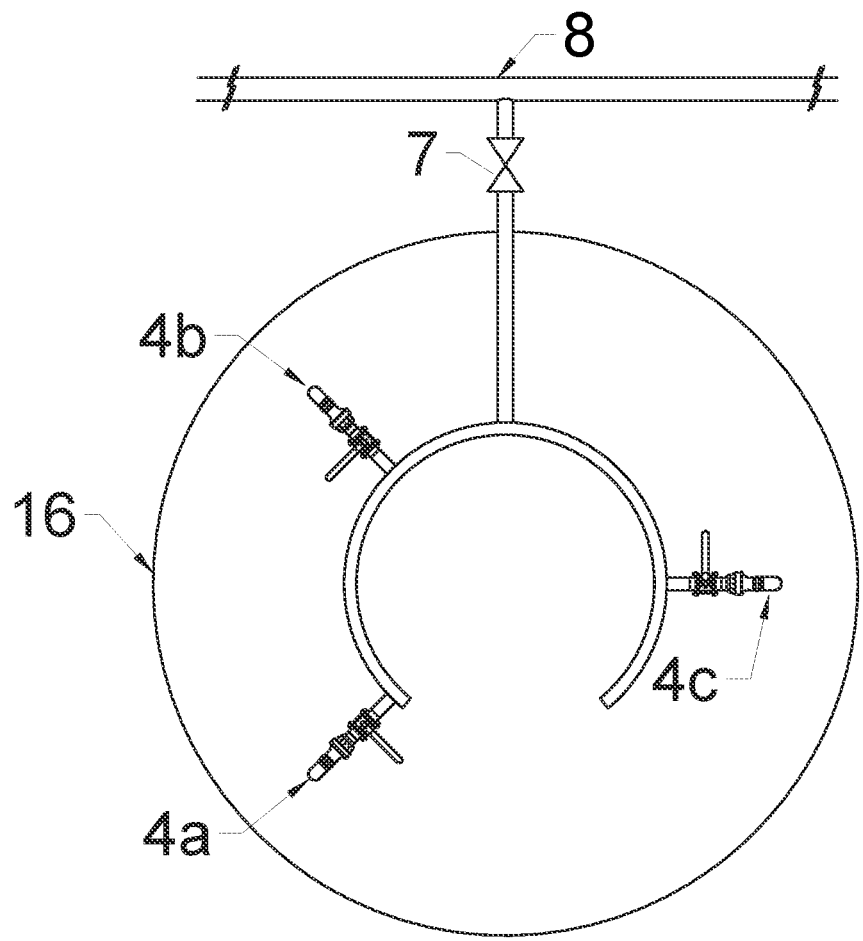

FIGS. 4 and 5 show equipment for the pressurised injection of air according to the invention installed in a tank (15) having a flat bottom with legs.

The means for the pressurised injection of air, i.e., diffusers (4a, 4b, 4c), depicted in FIG. 4, inject air into the tank, simultaneously striking at least two regions of the cap during the actuation of the system, and are located at the flat bottom of the tank (15) at a different height or level, so the pressure and beam aperture conditions in each injection are different.

As seen in FIG. 5, the means for the pressurised injection of air, i.e., diffusers (4a, 4b, 4c), are located between the compressed air distribution circuit (8) and the wall (16) of the tank.

Example 3: Tank Having a Flat Horizontal Bottom Arranged on a Mount

Figure 6:
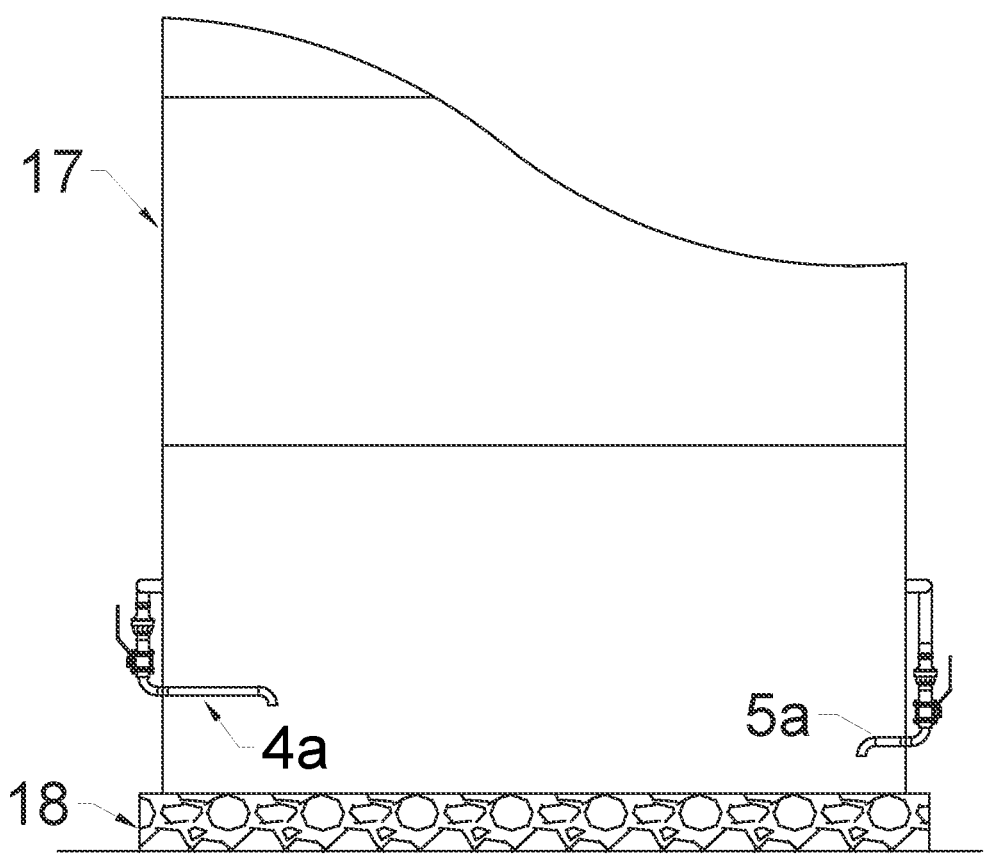
FIGS. 6, 7, and 8 show equipment for the pressurised injection of air according to the invention installed in a tank having a flat horizontal bottom arranged on a mount.
Figure 7:
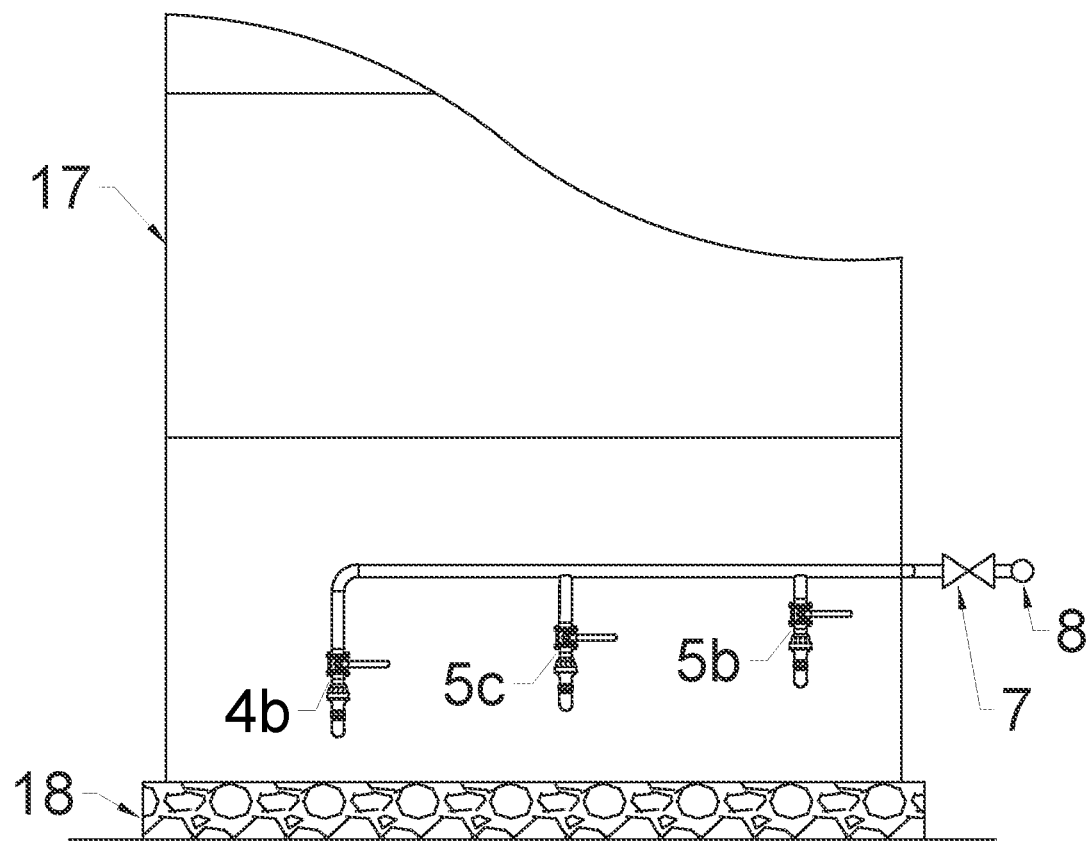
Figure 8:
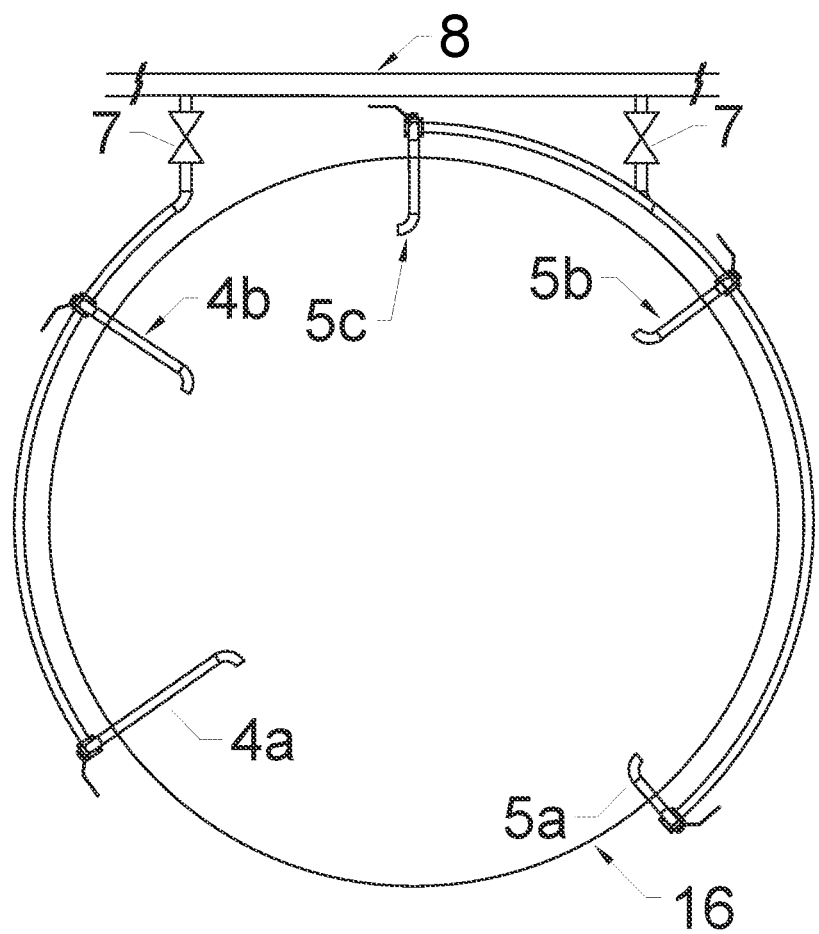

FIGS. 6, 7, and 8 show equipment for the pressurised injection of air according to the invention installed in a tank (17) having a flat horizontal bottom arranged on a mount (18).

The means for the pressurised injection of air, i.e., diffusers (4a, 4b, 5a, 5b, 5c), inject air (3) into the tank, simultaneously striking at least two regions of the cap during the actuation of the system, and are located in the wall of the tank (17) at a different height or level as seen in FIGS. 6 and 7, so the pressure and beam aperture conditions in each injection are different.

As seen in FIG. 8, the means for the pressurised injection of air, i.e., diffusers (4a, 4b, 5a, 5b, 5c), are located between the compressed air distribution circuit (8) and the inside of the tank (17). Said diffusers are located at a different distance between the inner portion or end of the diffusers (4a, 4b, 5a, 5b, 5c) and the vertical axis of the tank (17), and likewise, the diffusers (4a, 4b, 5a, 5b, 5c) have an asymmetrical shape in relation to the axes of the section of the tank (17).

Figure 8B:
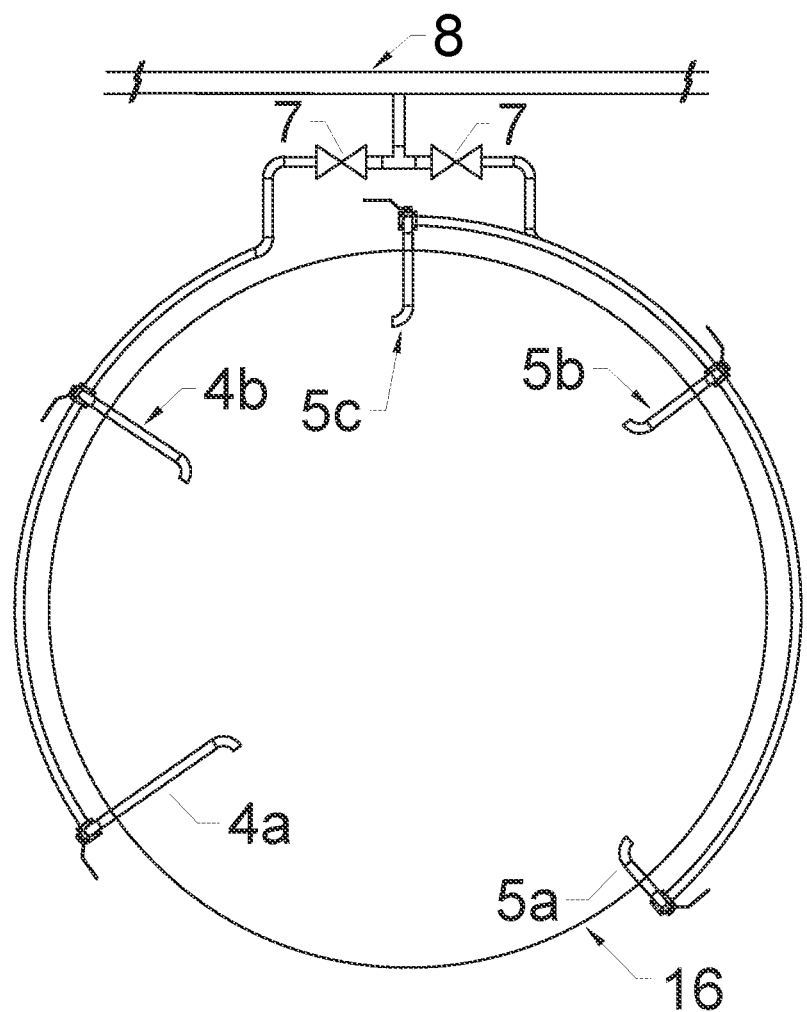
FIG. 8B shows another embodiment of the invention, varying the tapping mode in the compressed air distribution circuit.

FIG. 8B depicts another embodiment of the invention in which a single tapping is performed in the compressed air distribution circuit (8), maintaining the same operating principle.

Example 4: Tank Having a Flat Inclined Bottom Arranged on a Mount

Figure 9:
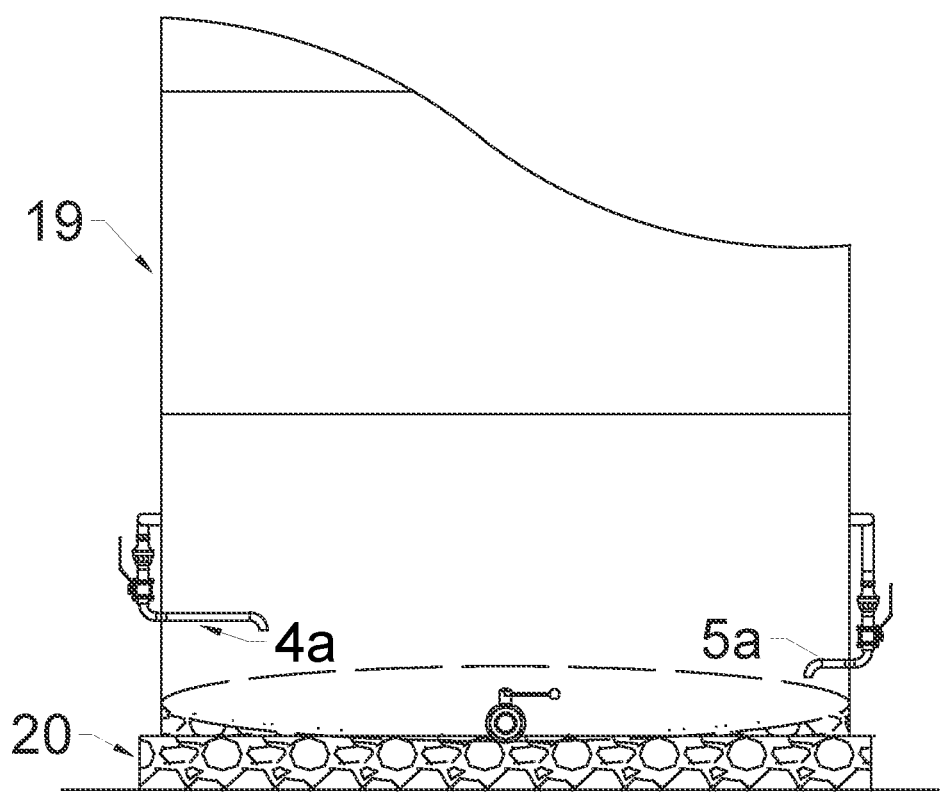
FIGS. 9, 10, and 11 show equipment for the pressurised injection of air according to the invention installed in a tank having a flat inclined bottom arranged on a mount.
Figure 10:
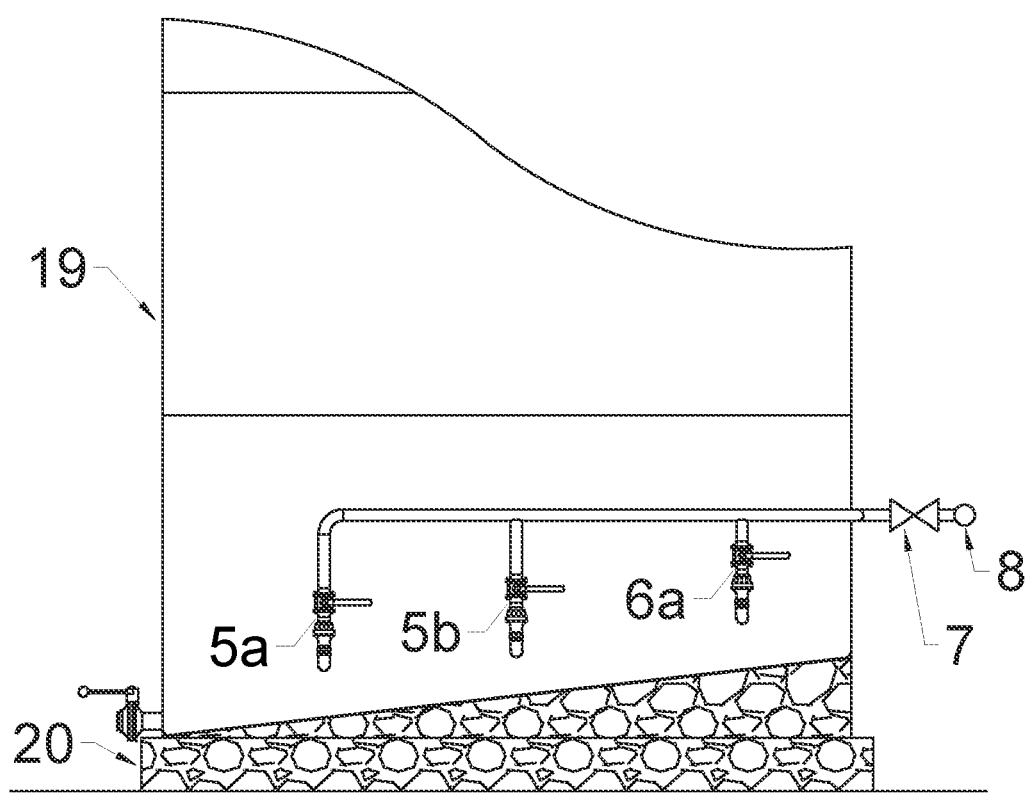
Figure 11:
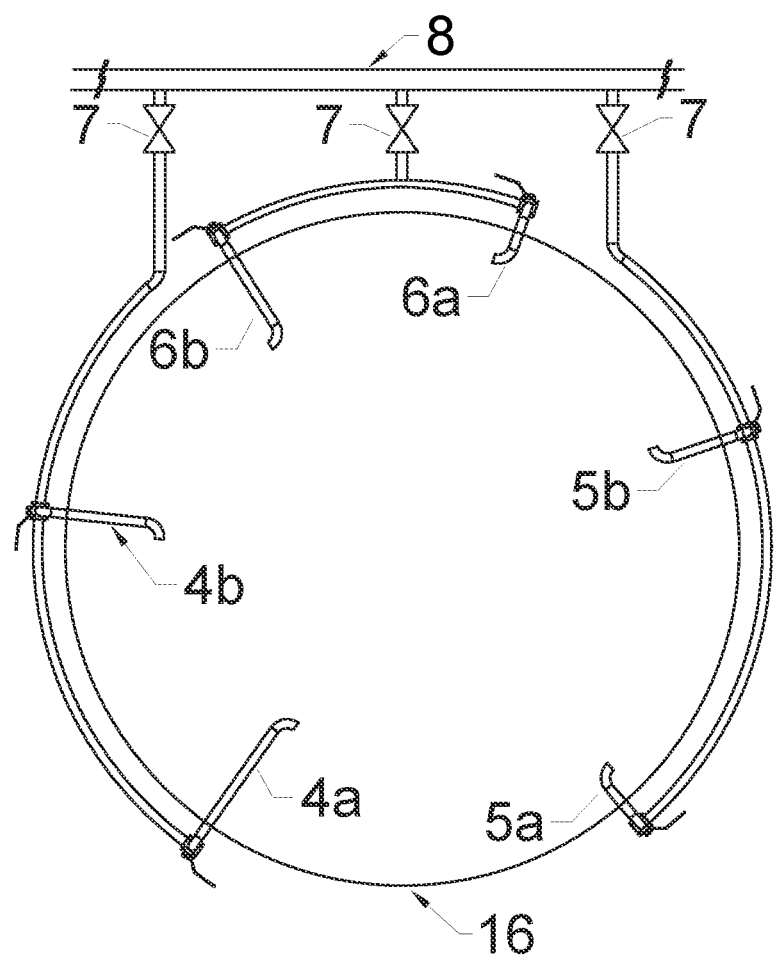

FIGS. 9, 10, and 11 show equipment for the pressurised injection of air according to the invention installed in a tank (19) having a flat inclined bottom arranged on a mount (20).

The diffusers (4a, 4b, 5a, 5b, 6a, 6b) inject air (3) into the tank, simultaneously striking at least two regions of the cap during the actuation of the system, and are located in the wall of the tank (19) at a different height or level as seen in FIGS. 9 and 10, so the pressure and beam aperture conditions in each injection are different.

As seen in FIG. 11, the means for the pressurised injection of air, i.e., diffusers (4a, 4b, 5a, 5b, 6a, 6b), are located between the compressed air distribution circuit (8) and the inside of the tank (19). Said diffusers are located at a different distance between the inner portion or end of the diffusers (4a, 4b, 5a, 5b, 6a, 6b) and the vertical axis of the tank (19), and likewise, the diffusers (4a, 4b, 5a, 5b, 6a, 6b) have an asymmetrical shape in relation to the axes of the section of the tank (19).

Figure 11B:
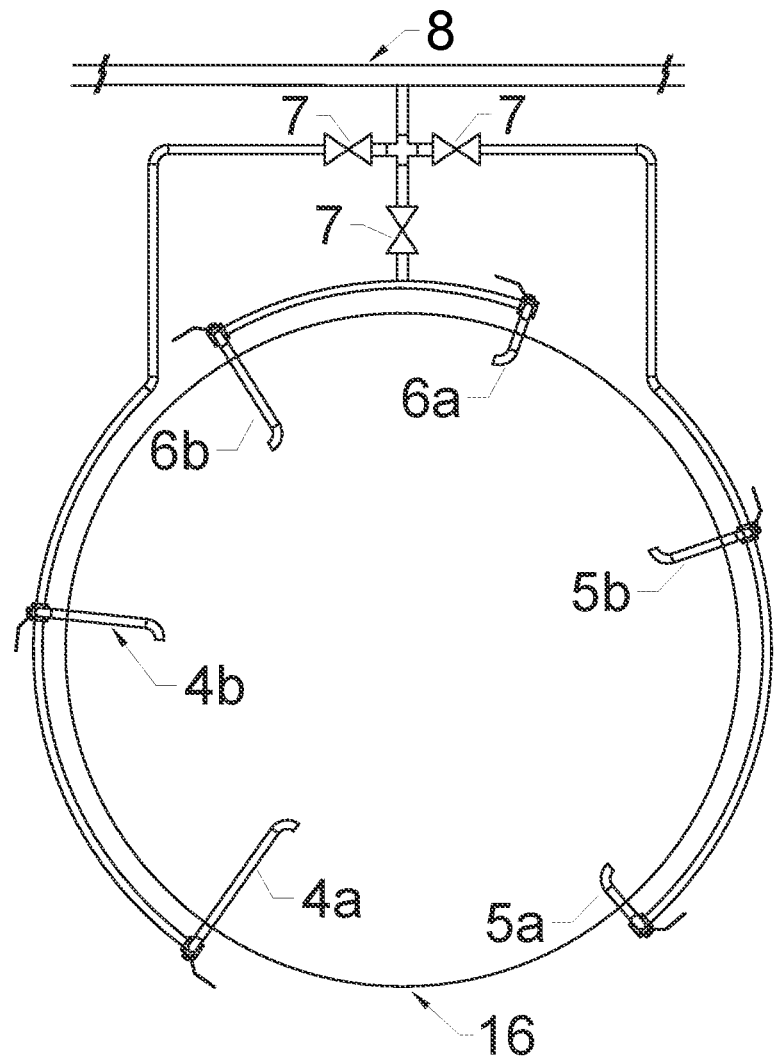
FIG. 11B shows another embodiment of the invention, varying the tapping mode in the compressed air distribution circuit.

Again, FIG. 11B depicts another embodiment of the invention in which a single tapping is performed in the compressed air distribution circuit (8), likewise maintaining the same operating principle.

To complete the description that is being made, in addition to the exemplary embodiments described above, embodiments having common characteristics are described in detail below.

Figure 12:
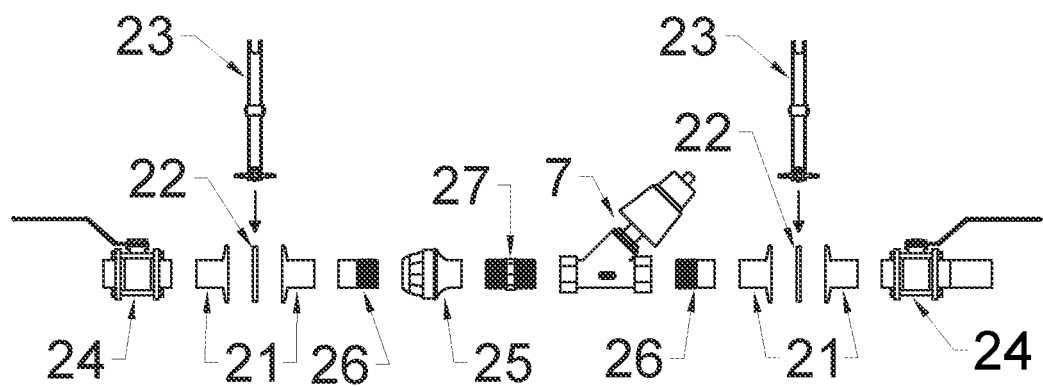
FIG. 12 shows an exploded view of the assembly of the on-off valves (7) of the compressed air distribution circuit for the equipment for the pressurised injection of air according to the invention.

To enable putting the on-off valves (7) of the compressed air distribution circuit out of operation in an independent manner, as depicted in FIG. 12, said valves (7) are located between clamp connections formed by connection bushings (21), a gasket (22), and a clamp (23), installed between ball valves (24). Additionally, the compressed air distribution circuit includes upstream of the on-off valves (7) check valves (25) mounted between threaded/gas junctions (26) and incorporating a threaded/gas head (27).

Logically, the present invention is in no way limited to the described and depicted embodiments, but any variant or modification within the limit of the attached claims will be readily apparent to the skilled person. Particularly, the pumping-over system according to the invention can be installed in polygonal tanks having any number of sides.

The invention claimed is:

1. A method for pumping over a grape harvest during maceration comprising:
   injecting pressurized air or other gasses in a controlled manner into a tank simultaneously striking at least two regions of a cap formed on a top portion of the tank by means for a pressurized injection of air or other gases by means of a compressed air distribution circuit located outside a tank wherein the means for a pressurized injection of air or other gases comprises at least two diffusers having gas outlets located at different heights or levels on a lower portion of the tank,
   wherein each of the at least two diffusers comprises an on-off valve connected to a compressed air distribution circuit,
   wherein an injection time during which each of the at least two diffusers introduces air or other gasses into the tank continuously comprises between 1 and 10 seconds,
   wherein a switching time elapsing between injection by each of the at least two diffusers comprises between 0.5 and 10 minutes,
   wherein a cycle rest time elapsing between an end of a pumping over cycle of each of the at least two diffusers and a start of the following pumping over cycle comprises between 90 and 720 minutes,
   wherein a cycle consists of actuation of each of the at least two diffusers sequentially, and
   wherein the injection time, the switching time and the cycle rest time are controlled through a microprocessor located outside of the tank, wherein the microprocessor controls the on-off valves of the compressed air distribution circuit through corresponding control circuits from solenoid valves or control valves installed in a junction box or control valve center.

2. The method for pumping over the grape harvest during maceration according to claim 1, wherein the means for pressurized injection of air or other gases have different degrees of penetration into the tank.

3. The method for pumping over the grape harvest during maceration according to claim 1, wherein the gas outlets of the diffusers for the pressurized injection of air or other gases are provided in an asymmetrical manner in relation to axes X and Y of an horizontal section of the tank.

4. The method for pumping over the grape harvest during maceration according to claim 1, further comprising a step of injecting water into the tank by means of the at least two diffusers, wherein the water entrains waste products of wine making from an inside of the at least two diffusers, cleaning said inside, followed by a step of drying the at least two diffusers using compressed air.

5. The method for pumping over the grape harvest during maceration according to claim 1, wherein in the step of injecting pressurized air or other gasses purified air is used or a step of purifying compressed air is performed before the_step of injecting pressurized air or other gasses into the tank.

6. The method for pumping over a grape harvest during maceration according to claim 1, wherein the means for a pressurized injection of air or other gases comprises three or more diffusers.

7. A means for pumping over the grape harvest, comprising:
   a pressurized injection of air or other gases comprising at least two diffusers for the pressurized injection of air or other gases in a controlled manner into wine making tanks with gas outlets of the at least two diffusers located at different heights or levels on a lower portion of the tanks, wherein each of the at least two diffusers comprises an on-off valve connected to a compressed air distribution circuit,
   a microprocessor located outside of the tanks configured to control an injection time, a switching time and a cycle rest time by controlling the on-off valves of the compressed air distribution circuit through corresponding control circuits from solenoid valves or control valves installed in a junction box or control valve center,
   wherein the at least two diffusers are configured to inject air into the tanks, simultaneously striking at least two regions of a cap formed on a top portion of the tanks,
   wherein the injection time during which each pair of diffusers introduces gas into the tanks continuously comprises between 1 and 10 seconds, the switching time elapsing between injection by each of the at least two diffusers comprises between 0.5 and 10 minutes, and the cycle rest time which elapses between an end of a pumping over cycle of diffusers and a start of the following pumping over cycle comprises between 90 and 720 minutes under control of the microprocessor, wherein a cycle consists of an actuation of all the pairs of diffusers sequentially.

8. The means for pumping over the grape harvest according to claim 7, wherein the diffusers have different degrees of penetration into the tanks.

9. The means for pumping over the grape harvest according to claim 7, wherein the compressed air distribution circuit comprises a water intake configured to clean the diffusers once the pumping over of the grape harvest processed in the wine making tanks has been completed.

10. The means for pumping over the grape harvest according to claim 7, wherein the gas outlets of the diffusers are provided in an asymmetrical manner in relation to the axes X and Y of an horizontal section of the tanks.

11. The means for pumping over the grape harvest according to claim 6, wherein the means for a pressurized injection of air or other gases comprises three or more diffusers.

* * * * *